United States Patent Office.

CARL JOHANN EUGEN DE HAËN, OF LIST, GERMANY.

METHOD OF MAKING SULFURIC ANHYDRID.

SPECIFICATION forming part of Letters Patent No. 687,834, dated December 3, 1901.

Application filed July 8, 1901. Serial No. 67,569. (No specimens.)

*To all whom it may concern:*

Be it known that I, CARL JOHANN EUGEN DE HAËN, a subject of the Emperor of Germany, residing at List, near Hanover, Germany, have invented certain new and useful Improvements in and Connected with the Manufacture of Sulfuric Anhydrid, (for which I have applied for a patent in Germany on the 11th of April, 1900; in France on the 22d of April, 1901; in Great Britain on the 25th of April, 1901, and in Belgium on the 27th of April, 1901,) of which the following is a full, clear, and exact specification.

In the manufacture of sulfuric anhydrid from sulfurous acid and atmospheric oxygen by the catalytic method finely-divided platinum in the shape of platinized asbestos or platinized pumice-stone is most frequently employed as the catalytic body. The attempts to replace the expensive platinum by much cheaper catalytic substances have not hitherto been very successful, either because the efficiency of these substances as oxygen-transmitters has been too low, or because these substances rapidly deteriorated as regards their catalytic effect and soon became quite useless, or because they required a very large plant for producing any considerable quantities of sulfuric anhydrid, as is the case, for instance, with oxid of iron. I have found that vanadium or its compounds, and especially venadic acid, are eminently suitable as oxygen-transmitters and that their employment in the manufacture of sulfuric anhydrid offers important advantages. The fact that under certain conditions vanadic acid has the power of transmitting oxygen may be concluded from the experiments on the oxidation of toluol published in the *Journal für praktische Chemie,* (N. F. Vol. 51, page 108;) but hitherto the acid has not found any practical utilization as a catalytic substance, nor has anything further been published on its property of transmitting oxygen.

Sulfurous acid may be easily converted into sulfuric anhydrid by conducting a mixture of sulfurous acid with atmospheric air over finely-divided vanadic acid. For carrying out this process it is advantageous to impregnate asbestos with a solution of ammonium vanadiate or of another soluble vanadium compound, after which the asbestos is dried and calcined, thereby producing a catalytic substance containing vanadic acid in a state of fine division, over which the mixture of sulfurous acid and air is caused to pass, preferably at incipient red heat. At a temperature of 465° centigrade, eighty-four per cent. of the sulfurous acid has been thus converted into sulfuric anhydrid. The conversion continues with undiminished vigor even after the gas mixture has been conducted over the prepared asbestos for a long time, which is a considerable advantage in comparison with other catalytic substances.

In comparison with platinum, vanadic acid has the advantage of being much cheaper, and in comparison with oxid of iron it has the important advantage that the apparatus required for producing a given quantity of sulfuric anhydrid is much smaller and acts with certainty.

Instead of asbestos containing vanadic acid in a fine state of division pumice-stone or other highly-porous mineral matter impregnated with a suitable vanadium compound may be used for the manufacture of sulfuric anhydrid by the catalytic method.

What I claim is—

1. The process for converting sulfurous acid into sulfuric anhydrid, which consists in causing sulfurous acid and atmospheric air to come into contact with finely-divided vanadic acid, substantially as described.

2. The process for converting sulfurous acid into sulfuric anhydrid, which consists in conducting a mixture of sulfurous acid and atmospheric air over finely-divided vanadic acid, substantially as described.

3. The process for the manufacture of sulfuric anhydrid, which consists in causing a mixture of sulfurous acid and atmospheric air to pass over heated asbestos containing vanadic acid in a fine state of division, substantially as described.

In witness whereof I have hereunto set my hand in the presence of two subscribing witnesses.

CARL JOHANN EUGEN DE HAËN.

Witnesses:
 LEONORE RASCH,
 C. C. STEVENSON.